US011767005B2

(12) United States Patent
Moorman et al.

(10) Patent No.: US 11,767,005 B2
(45) Date of Patent: Sep. 26, 2023

(54) TEST SEQUENCE FOR BRAKE SYSTEM

(71) Applicant: GM Global Technology Operations LLC, Detroit, MI (US)

(72) Inventors: Steven P. Moorman, Dexter, MI (US); Bret M. Olson, Whitelake, MI (US); Shawn M. Harris, Belleville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 636 days.

(21) Appl. No.: 16/999,152

(22) Filed: Aug. 21, 2020

(65) Prior Publication Data

US 2022/0055599 A1 Feb. 24, 2022

(51) Int. Cl.
*B60T 13/74* (2006.01)
*B60T 17/22* (2006.01)
*B60T 13/68* (2006.01)
*B60T 13/14* (2006.01)

(52) U.S. Cl.
CPC .......... *B60T 17/221* (2013.01); *B60T 13/146* (2013.01); *B60T 13/686* (2013.01); *B60T 13/745* (2013.01); *B60T 2270/406* (2013.01)

(58) Field of Classification Search
CPC .... B60T 13/146; B60T 13/686; B60T 13/745; B60T 2270/406; B60T 17/221
See application file for complete search history.

(56) References Cited

U.S. PATENT DOCUMENTS

| 5,327,781 | A | * | 7/1994 | Moran | B60T 8/885 |
| | | | | | 73/121 |
| 5,357,800 | A | * | 10/1994 | Reuter | B60T 8/90 |
| | | | | | 73/39 |
| 5,499,866 | A | * | 3/1996 | Brugger | B60T 8/90 |
| | | | | | 303/122.08 |
| 5,767,397 | A | * | 6/1998 | Eisele | B60T 17/221 |
| | | | | | 73/39 |
| 6,206,489 | B1 | * | 3/2001 | Schmidt | B60T 17/221 |
| | | | | | 303/122.08 |
| 10,752,231 | B2 | * | 8/2020 | Rasmussen | B60T 8/17 |
| 11,590,945 | B2 | * | 2/2023 | Einig | B60T 13/146 |
| 2004/0237638 | A1 | * | 12/2004 | Reviol | B60T 8/36 |
| | | | | | 73/121 |
| 2016/0221561 | A1 | * | 8/2016 | Leroy | B60T 17/02 |
| 2016/0311422 | A1 | * | 10/2016 | van Zanten | G01M 3/2869 |
| 2017/0327098 | A1 | * | 11/2017 | Leiber | B60T 7/042 |
| 2018/0172174 | A1 | * | 6/2018 | Gardt | B60T 8/341 |
| 2018/0257629 | A1 | * | 9/2018 | Rasmussen | B60T 17/221 |

(Continued)

FOREIGN PATENT DOCUMENTS

WO 2019133962 A1 7/2019

*Primary Examiner* — Bradley T King
(74) *Attorney, Agent, or Firm* — Vivacqua Crane, PLLC (57) ABSTRACT

A method of testing a braking system for an automotive vehicle that includes a master cylinder, a brake booster, a plurality of brake assemblies, a plurality of inlet valves, each inlet valve adapted to selectively allow brake fluid to flow into one of the plurality of brake assemblies and a plurality of outlet valves, each outlet valve adapted to selectively allow brake fluid to flow from one of the brake assemblies to a brake fluid reservoir, the method includes testing a first one of the plurality of inlet valves, testing a first one of the plurality of outlet valves, and sending diagnostic information to a controller within the automotive vehicle.

20 Claims, 4 Drawing Sheets

(56) References Cited

U.S. PATENT DOCUMENTS

| | | | | |
|---|---|---|---|---|
| 2020/0041568 | A1* | 2/2020 | Oehler | G01R 31/50 |
| 2021/0070273 | A1* | 3/2021 | Timm | B60T 17/22 |
| 2021/0206362 | A1* | 7/2021 | Wallbaum | B60T 13/683 |
| 2021/0316709 | A1* | 10/2021 | Thierer | B60T 7/042 |
| 2022/0089168 | A1* | 3/2022 | Hoos | H02J 7/1423 |
| 2023/0097781 | A1* | 3/2023 | Bechmann | B60T 13/62 |
| | | | | 303/6.01 |

* cited by examiner

TEST SEQUENCE FOR BRAKE SYSTEM

INTRODUCTION

The present disclosure relates to a method of testing components within a braking system. Automotive vehicles are commonly slowed and stopped with hydraulic brake systems. These systems typically include a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Brake systems typically use a brake booster which pressurizes the brake fluid beyond what is capable by the master cylinder. New advanced systems related to braking, such as anti-lock braking (ABS) and traction control requires precise control of the braking of each wheel independently. To accomplish this control, the hydraulic circuit that provides pressurized brake fluid from the brake booster and the master cylinder to the brakes at each of the wheels of the vehicle includes valves to selectively block or allow flow of brake fluid to and from the wheels of the vehicle.

It is important to ensure that all of the valves are operating properly. Current systems do not provide the ability to test and diagnose the operation of such valves. Thus, while current braking systems achieve their intended purpose, there is a need for a new and improved test sequence for such brake systems.

SUMMARY

According to several aspects of the present disclosure, a method of testing a braking system for an automotive vehicle that includes a master cylinder, a brake booster, a plurality of brake assemblies, a plurality of inlet valves, each inlet valve adapted to selectively allow brake fluid to flow into one of the plurality of brake assemblies and a plurality of outlet valves, each outlet valve adapted to selectively allow brake fluid to flow from one of the brake assemblies to a brake fluid reservoir, the method includes testing a first one of the plurality of inlet valves, testing a first one of the plurality of outlet valves, and sending diagnostic information to a controller within the automotive vehicle.

According to another aspect, testing a first one of the plurality of inlet valves further includes closing all of the inlet valves, actuating the brake booster and increasing the pressure of the brake fluid between the brake booster and the inlet valves to a pre-determined Boost Pressure, measuring a first plunger volume of the brake booster, opening the first one of the plurality of inlet valves, actuating the brake booster and increasing the pressure of the brake fluid between the brake booster and the inlet valves to the pre-determined Boost Pressure, measuring a second plunger volume of the brake booster, and when the difference between the first and second plunger volume exceeds an Expected Difference Threshold, sending diagnostic information that the first one of the plurality of inlet valves has not failed to the controller within the automotive vehicle.

According to another aspect, the method further includes when the difference between the first and second plunger volume does not exceed the Expected Difference Threshold, and when the first plunger volume exceeds a Fail Open Threshold, sending diagnostic information that the first one of the plurality of inlet valves has failed to an open state to the controller within the automotive vehicle.

According to another aspect, the method further includes when the difference between the first and second plunger volume does not exceed the Expected Difference Threshold, and when the first plunger volume does not exceed the Fail Open Threshold, sending diagnostic information that the first one of the plurality of inlet valves has failed to a closed state to the controller within the automotive vehicle.

According to another aspect, testing a first one of the plurality of inlet valves further includes opening the first one of the plurality of outlet valves, and when the pressure of the brake fluid between the brake booster and the inlet valves drops below a pre-determined threshold within a pre-determined amount of time, sending diagnostic information that the first one of the plurality of outlet valves has not failed to the controller within the automotive vehicle.

According to another aspect, the method further includes, when the pressure of the brake fluid between the brake booster and the inlet valves does not drop below a pre-determined threshold within a pre-determined amount of time, sending diagnostic information that the first one of the plurality of outlet valves has failed to a closed position to the controller within the automotive vehicle.

According to another aspect, the method further includes, testing the first one of the plurality of inlet valves and testing the first one of the plurality of outlet valves upon the occurrence of an operating event of the automotive vehicle, testing a second one of the plurality of inlet valves and testing a second one of the plurality of outlet valves upon the next occurrence of the operating event of the automotive vehicle.

According to another aspect, the method further includes, testing the first one of the plurality of inlet valves and testing the first one of the plurality of outlet valves upon the occurrence of an operating event of the automotive vehicle, and sequentially testing a different one of the plurality of inlet valves and testing a different one of the plurality of outlet valves upon each occurrence of the operating event of the automotive vehicle.

According to another aspect, a primary boost isolation valve is positioned between the brake booster and two of the plurality of inlet valves and between the master cylinder and the two of the plurality of inlet valves, the primary boost isolation valve is selectively moveable between a first position, wherein flow of brake fluid only from the master cylinder to the two of the plurality of inlet valves is open, a second position, wherein flow of brake fluid from only the brake booster to the two of the plurality of inlet valves is open, and a third position, wherein flow of brake fluid from both the master cylinder and the brake booster to the two of the plurality of inlet valves is open, and a secondary boost isolation valve is positioned between the brake booster and at the remaining of the plurality of inlet valves and between the master cylinder and the remaining of the plurality of inlet valves, the secondary boost isolation valve is selectively moveable between a first position, wherein flow of brake fluid only from the master cylinder to the remaining of the plurality of inlet valves is open, a second position, wherein flow of brake fluid from only the brake booster to the remaining of the plurality of inlet valves is open, and a third position, wherein flow of brake fluid from both the master cylinder and the brake booster to the remaining of the plurality of inlet valves is open, the method further including actuating the primary boost isolation valve to the first position, actuating the secondary boost isolation valve to the second position, actuating all of the plurality of inlet valves to the closed position, actuating the brake booster to increase the pressure of the brake fluid between the brake booster and the primary and secondary boost isolation valves to a pre-determined level, thereby causing the primary boost isolation valve to spontaneously move to the third position, wherein pressure between the brake booster and the primary and secondary boost isolation valves is substantially equal to the pressure of the brake fluid between the master cylinder and the primary and secondary boost isolation valves, de-activating the brake booster, thereby causing the primary boost isolation valve to spontaneously move back to the first position, actuating the remaining of the plurality of inlet valves to the open position, actuating the remaining of the plurality of outlet valves to the open position, actuating the secondary boost isolation valve to the first position, and when the pressure of the brake fluid between the master cylinder and the secondary boost isolation valve falls below a pre-determined threshold within a pre-determined amount of time, sending diagnostic information that the secondary boost isolation valve is functioning properly.

According to another aspect, the method further includes, when the pressure of the brake fluid between the master cylinder and the secondary boost isolation valve does not fall below a pre-determined threshold within a pre-determined amount of time, sending diagnostic information that the secondary boost isolation valve has failed.

According to several aspects of the present disclosure, a method of testing a braking system for an automotive vehicle that includes a brake booster, a first brake assembly associated with a first wheel of the automotive vehicle, a second brake assembly associated with a second wheel of the automotive vehicle, a third brake assembly associated with a third wheel of the motor vehicle, and a fourth brake assembly associated with a fourth wheel of the automotive vehicle, a first inlet valve adapted to selectively allow flow of brake fluid to the first brake assembly, a second inlet valve adapted to selectively allow flow of brake fluid to the second brake assembly, a third inlet valve adapted to selectively allow flow of brake fluid to the third brake assembly, and a fourth inlet valve adapted to selectively allow flow of brake fluid to the fourth brake assembly, a first outlet valve adapted to selectively allow brake fluid to flow from the first brake assembly to a brake fluid reservoir, a second outlet valve adapted to selectively allow flow of brake fluid from the second brake assembly to the brake fluid reservoir, a third outlet valve adapted to selectively allow flow of brake fluid from the third brake assembly to the brake fluid reservoir, and a fourth outlet valve adapted to selectively allow brake fluid to flow from the fourth brake assembly to the brake fluid reservoir, the method comprising sequentially and alternately testing one of the first inlet valve and the first outlet valve, the second inlet valve and the second outlet valve, the third inlet valve and the third outlet valve and the fourth inlet valve and the fourth outlet valve upon consecutive occurrences of an operational event of the automotive vehicle, and sending diagnostic information to a controller within the automotive vehicle each time one of the first inlet valve and the first outlet valve, the second inlet valve and the second outlet valve, the third inlet valve and the third outlet valve and the fourth inlet valve and the fourth outlet valve is tested.

According to another aspect, sequentially and alternately testing one of the first inlet valve and the first outlet valve, the second inlet valve and the second outlet valve, the third inlet valve and the third outlet valve and the fourth inlet valve and the fourth outlet valve upon the occurrence of an operational event of the automotive vehicle further includes closing the first, second, third and fourth inlet valves, actuating the brake booster and increasing the pressure of the brake fluid between the brake booster and the inlet valves to a pre-determined Boost Pressure, measuring a first plunger volume of the brake booster, actuating one of the first, second, third and fourth inlet valves to an open position, actuating the brake booster and increasing the pressure of the brake fluid between the brake booster and the first, second, third and fourth inlet valves to the pre-determined Boost Pressure, measuring a second plunger volume of the brake booster, and when the difference between the first and second plunger volume exceeds an Expected Difference Threshold, sending diagnostic information that the actuated one of the first, second, third and fourth inlet valves has not failed to the controller within the automotive vehicle.

According to another aspect, the method further includes, when the difference between the first and second plunger volume does not exceed the Expected Difference Threshold, and when the first plunger volume exceeds a Fail Open Threshold, sending diagnostic information that the actuated one of the first, second, third and fourth inlet valves has failed to an open state to the controller within the automotive vehicle.

According to another aspect, the method further includes, when the difference between the first and second plunger volume does not exceed the Expected Difference Threshold, and when the first plunger volume does not exceed the Fail Open Threshold, sending diagnostic information that the actuated one of the first, second, third and fourth inlet valves has failed to a closed state to the controller within the automotive vehicle.

According to another aspect, sequentially and alternately testing one of the first inlet valve and the first outlet valve, the second inlet valve and the second outlet valve, the third inlet valve and the third outlet valve and the fourth inlet valve and the fourth outlet valve upon the occurrence of an operational event of the automotive vehicle further includes actuating one of the first, second, third and fourth outlet valves corresponding to the actuated one of the first, second, third and fourth inlet valves to an open position, and when the pressure of the brake fluid between the brake booster and the first, second, third and fourth inlet valves drops below a pre-determined threshold within a pre-determined amount of time, sending diagnostic information that the actuated one of the first, second, third and fourth outlet valves has not failed to the controller within the automotive vehicle.

According to another aspect, the method further includes, when the pressure of the brake fluid between the brake booster and the first, second, third and fourth inlet valves does not drop below a pre-determined threshold within a pre-determined amount of time, sending diagnostic information that the actuated one of the first, second, third and fourth outlet valves has failed to a closed position to the controller within the automotive vehicle.

According to another aspect, a primary boost isolation valve is positioned between the brake booster and the first and second inlet valves and between the master cylinder and the first and second inlet valves, the primary boost isolation valve is selectively moveable between a first position, wherein flow of brake fluid only from the master cylinder to the first and second inlet valves is open, a second position, wherein flow of brake fluid from only the brake booster to the first and second inlet valves is open, and a third position, wherein flow of brake fluid from both the master cylinder and the brake booster to the first and second inlet valves is open, a secondary boost isolation valve is positioned between the brake booster and at the third and fourth inlet valves and between the master cylinder and the third and fourth inlet valves, the secondary boost isolation valve is selectively moveable between a first position, wherein flow of brake fluid only from the master cylinder to the third and fourth inlet valves is open, a second position, wherein flow of brake fluid from only the brake booster to the third and fourth inlet valves is open, and a third position, wherein flow of brake fluid from both the master cylinder and the brake booster to the third and fourth inlet valves is open, the method including, actuating the primary boost isolation valve to the first position, actuating the secondary boost isolation valve to the second position, actuating the first, second third and fourth inlet valves to the closed position, actuating the brake booster to increase the pressure of the brake fluid between the brake booster and the primary and secondary boost isolation valves to a pre-determined level, thereby causing the primary boost isolation valve to spontaneously move to the third position, wherein pressure between the brake booster and the primary and secondary boost isolation valves is substantially equal to the pressure of the brake fluid between the master cylinder and the primary and secondary boost isolation valves, de-activating the brake booster, thereby causing the primary boost isolation valve to spontaneously move back to the first position, actuating the third and fourth inlet valves to the open position, actuating the third and fourth outlet valves to the open position, actuating the secondary boost isolation valve to the first position, and when the pressure of the brake fluid between the master cylinder and the secondary boost isolation valve falls below a pre-determined threshold within a pre-determined amount of time, sending diagnostic information that the secondary boost isolation valve is functioning properly, and when the pressure of the brake fluid between the master cylinder and the secondary boost isolation valve does not fall below a pre-determined threshold within a pre-determined amount of time, sending diagnostic information that the secondary boost isolation valve has failed.

According to several aspects of the present disclosure, a method of testing a braking system for an automotive vehicle includes, upon consecutive occurrences of an operational event of the automotive vehicle sequentially and alternately testing one of a first inlet valve and a first outlet valve that are associated with a first wheel and first brake assembly, a second inlet valve and a second outlet valve that are associated with a second wheel and a second brake assembly, a third inlet valve and a third outlet valve that are associated with a third wheel and a third brake assembly, and a fourth inlet valve and a fourth outlet valve that are associated with a fourth wheel and a fourth brake, wherein testing one of the first inlet valve and the first outlet valve, the second inlet valve and the second outlet valve, the third inlet valve and the third outlet valve and the fourth inlet valve and the fourth outlet valve further includes closing the first, second, third and fourth inlet valves, actuating a brake booster and increasing the pressure of brake fluid between the brake booster and the first, second, third and fourth inlet valves to a pre-determined Boost Pressure, measuring a first plunger volume of the brake booster, actuating one of the first, second, third and fourth inlet valves to an open position, actuating the brake booster and increasing the pressure of brake fluid between the brake booster and the first, second, third and fourth inlet valves to the pre-determined Boost Pressure, measuring a second plunger volume of the brake booster, and when the difference between the first and second plunger volume exceeds an Expected Difference Threshold, sending diagnostic information that the actuated one of the first, second, third and fourth inlet valves has not failed to the controller within the automotive vehicle, and when the difference between the first and second plunger volume does not exceed the Expected Difference Threshold, and when the first plunger volume exceeds a Fail Open Threshold, sending diagnostic information that the actuated one of the first, second, third and fourth inlet valves has failed to an open state to the controller within the automotive vehicle, and when the difference between the first and second plunger volume does not exceed the Expected Difference Threshold, and when the first plunger volume does not exceed the Fail Open Threshold, sending diagnostic information that the actuated one of the first, second, third and fourth inlet valves has failed to a closed state to the controller within the automotive vehicle.

According to another aspect, testing one of the first inlet valve and the first outlet valve, the second inlet valve and the second outlet valve, the third inlet valve and the third outlet valve and the fourth inlet valve and the fourth outlet valve further includes actuating one of the first, second, third and fourth outlet valves corresponding to the actuated one of the first, second, third and fourth inlet valves to an open position, and when the pressure of the brake fluid between the brake booster and the first, second, third and fourth inlet valves drops below a pre-determined threshold within a pre-determined amount of time, sending diagnostic information that the actuated one of the first, second, third and fourth outlet valves has not failed to the controller within the automotive vehicle, and when the pressure of the brake fluid between the brake booster and the first, second, third and fourth inlet valves does not drop below a pre-determined threshold within a pre-determined amount of time, sending diagnostic information that the actuated one of the first, second, third and fourth outlet valves has failed to a closed position to the controller within the automotive vehicle.

According to another aspect, the method further includes, actuating a primary boost isolation valve to a first position, wherein the primary boost isolation valve is positioned between the brake booster and the first and second inlet valves and between a master cylinder and the first and second inlet valves and is selectively moveable between a first position, wherein flow of brake fluid only from the master cylinder to the first and second inlet valves is open, a second position, wherein flow of brake fluid from only the brake booster to the first and second inlet valves is open, and a third position, wherein flow of brake fluid from both the master cylinder and the brake booster to the first and second inlet valves is open, actuating a secondary boost isolation valve to a second position, wherein the secondary boost isolation valve is positioned between the brake booster and at the third and fourth inlet valves and between the master cylinder and the third and fourth inlet valves, the secondary boost isolation valve is selectively moveable between a first position, wherein flow of brake fluid only from the master cylinder to the third and fourth inlet valves is open, a second position, wherein flow of brake fluid from only the brake booster to the third and fourth inlet valves is open, and a third position, wherein flow of brake fluid from both the master cylinder and the brake booster to the third and fourth inlet valves is open, actuating the first, second third and fourth inlet valves to the closed position, actuating the brake booster to increase the pressure of the brake fluid between the brake booster and the primary and secondary boost isolation valves to a pre-determined level, thereby causing the primary boost isolation valve to spontaneously move to the third position, wherein pressure between the brake booster and the primary and secondary boost isolation valves is substantially equal to the pressure of the brake fluid between the master cylinder and the primary and secondary boost isolation valves, de-activating the brake booster, thereby causing the primary boost isolation valve to spontaneously move back to the first position, actuating the third and fourth inlet valves to the open position, actuating the third and fourth outlet valves to the open position, actuating the secondary boost isolation valve to the first position, and when the pressure of the brake fluid between the master cylinder and the secondary boost isolation valve falls below a pre-determined threshold within a pre-determined amount of time, sending diagnostic information that the secondary boost isolation valve is functioning properly, and when the pressure of the brake fluid between the master cylinder and the secondary boost isolation valve does not fall below a pre-determined threshold within a pre-determined amount of time, sending diagnostic information that the secondary boost isolation valve has failed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
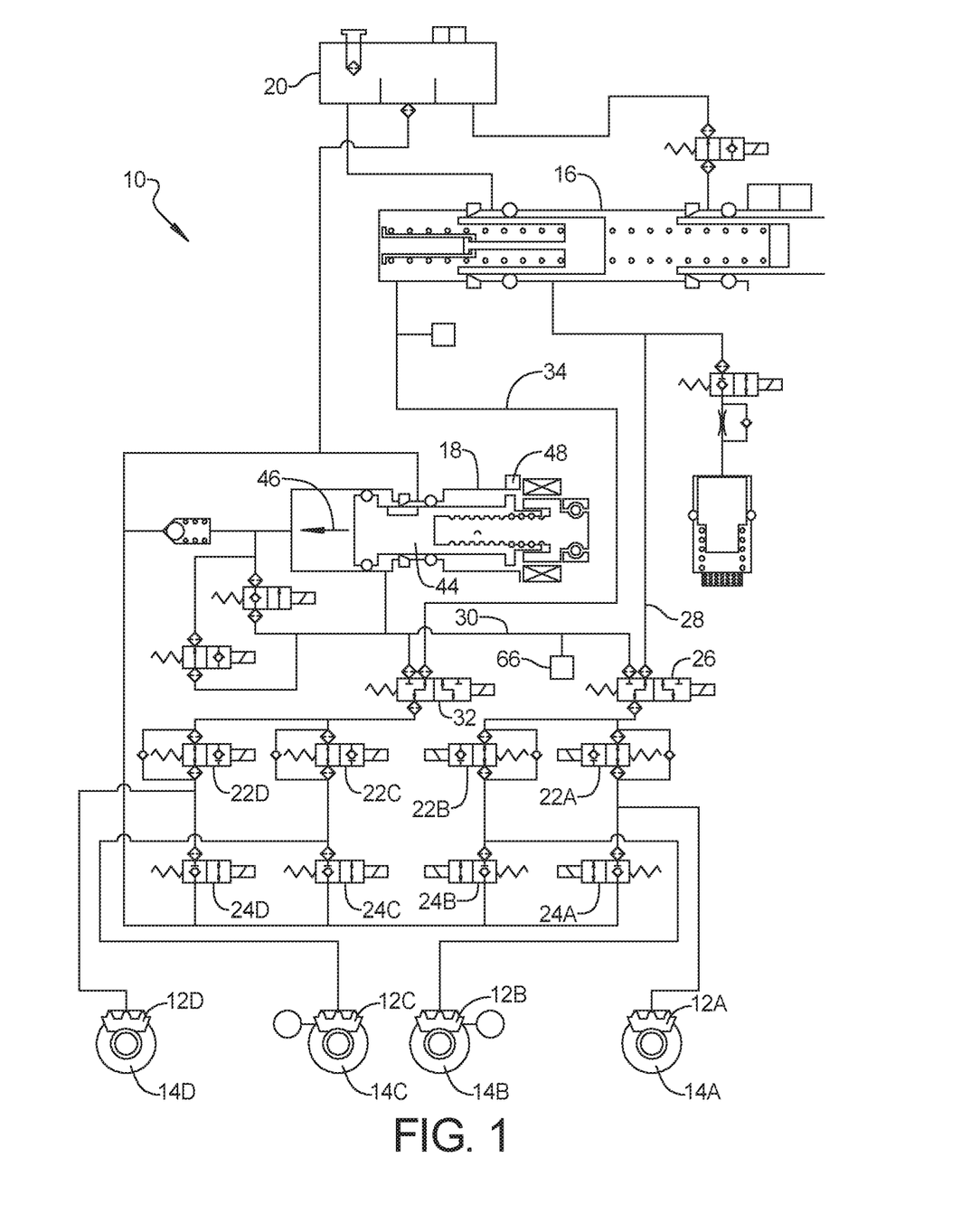
FIG. 1 is a brake system hydraulic system that incorporates a method according to an exemplary embodiment of the present disclosure.

Referring to FIG. 1, a hydraulic brake system 10 is adapted to provide pressurized brake fluid to a plurality of brake assemblies 12A, 12B, 12C, 12D in an automotive vehicle. In the exemplary embodiment shown in FIG. 1, the automotive vehicle includes a first wheel 14A, a second wheel 14B, a third wheel 14C, and a fourth wheel 14D. A first brake assembly 12A is associated with the first wheel 14A and is adapted to provide braking of the first wheel 14A. A second brake assembly 12B is associated with the second wheel 14B and is adapted to provide braking of the second wheel 14B. A third brake assembly 12C is associated with the third wheel 14C and is adapted to provide braking of the third wheel 14C. A fourth brake assembly 12D is associated with the fourth wheel 14D and is adapted to provide braking of the fourth wheel 14D.

Brake fluid within the hydraulic brake system 10 is pressurized by a master cylinder 16 and a brake booster 18. The master cylinder 16 and the brake booster 18 pull brake fluid from a brake fluid reservoir 20 and feed pressurized brake fluid to the hydraulic brake system 10. A plurality of inlet valves 22A, 22B, 22C, 22D are adapted to selectively allow brake fluid to flow into the brake assemblies 12A, 12B, 12C, 12D. A first inlet valve 22A is adapted to selectively allow brake fluid to flow into the first brake assembly 12A. A second inlet valve 22B is adapted to selectively allow brake fluid to flow into the second brake assembly 12B. A third inlet valve 22C is adapted to selectively allow brake fluid to flow into the third brake assembly 12C. A fourth inlet valve 22D is adapted to selectively allow brake fluid to flow into the fourth brake assembly 12D.

A plurality of outlet valves 24A, 24B, 24C, 24D are adapted to selectively allow brake fluid to flow out of the brake assemblies 12A, 12B, 12C, 12D. A first outlet valve 24A is adapted to selectively allow brake fluid to flow out of the first brake assembly 12A. A second outlet valve 24B is adapted to selectively allow brake fluid to flow out of the second brake assembly 12B. A third outlet valve 24C is adapted to selectively allow brake fluid to flow out of the third brake assembly 12C. A fourth outlet valve 24D is adapted to selectively allow brake fluid to flow out of the fourth brake assembly 12D.

A primary boost isolation valve 26 is positioned between the brake booster 18 and a portion of the plurality of inlet valves 22A, 22B, 22C, 22D and between the master cylinder 16 and the portion of the plurality of inlet valves 22A, 22B, 22C, 22D. The primary boost isolation valve 26 is fed by both the master cylinder 16 through a primary master cylinder circuit 28, and by the brake booster 18 through a brake booster circuit 30.

As shown in the exemplary embodiment of FIG. 1, the primary boost isolation valve 26 feeds brake fluid to the first and second inlet valves 22A, 22B. The primary boost isolation valve 26 is selectively moveable between a first position, a second position and a third position. When the primary boost isolation valve 26 is in the first position, the primary boost isolation valve 26 only allows brake fluid from the master cylinder 16 to flow to the first and second inlet valves 22A, 22B. When the primary boost isolation valve 26 is in the second position, the primary boost isolation valve 26 only allows brake fluid from the brake booster 18 to flow to the first and second inlet valves 22A, 22B. When the primary boost isolation valve 26 is in the third position, the primary boost isolation valve 26 allows brake fluid from both the master cylinder 16 and the brake booster 18 to flow to the first and second inlet valves 22A, 22B.

A secondary boost isolation valve 32 is positioned between the brake booster 18 and the remaining of the plurality of inlet valves 22A, 22B, 22C, 22D and between the master cylinder 16 and the remaining of the plurality of inlet valves 22A, 22B, 22C, 22D. The secondary boost isolation valve 32 is fed by both the master cylinder 16 through a secondary master cylinder circuit 34, and by the brake booster 18 through the brake booster circuit 30. As shown in the exemplary embodiment of FIG. 1, The secondary boost isolation valve 32 feeds brake fluid to the third and fourth inlet valves 22C, 22D. The secondary boost isolation valve 32 is selectively moveable between a first position, a second position and a third position. When the secondary boost isolation valve 32 is in the first position, the secondary boost isolation valve 32 only allows brake fluid from the master cylinder 16 to flow to the third and fourth inlet valves 22C, 22D. When the secondary boost isolation valve 32 is in the second position, the secondary boost isolation valve 32 only allows brake fluid from the brake booster 18 to flow to the third and fourth inlet valves 22C, 22D. When the secondary boost isolation valve 32 is in the third position, the secondary boost isolation valve 32 allows brake fluid from both the master cylinder 16 and the brake booster 18 to flow to the third and fourth inlet valves 22C, 22D.

A method of testing the hydraulic brake system 10 according to the present disclosure includes testing a first one of the plurality of inlet valves 22A, 22B, 22C, 22D, testing a first one of the plurality of outlet valves 24A, 24B, 24C, 24D, and sending diagnostic information to a controller within the automotive vehicle. In an exemplary embodiment, the first inlet valve 22A and the first outlet valve 24A, the second inlet valve 22B and the second outlet valve 24B, the third inlet valve 22C and the third outlet valve 24C and the fourth inlet valve 22D and the fourth outlet valve 24D are sequentially and alternately tested upon consecutive occurrences of an operational event of the automotive vehicle.

For example, when the ignition switch of the automotive vehicle is turned off, the first inlet valve 22A and the first outlet valve 24A are tested. The next time the automotive vehicle is used, and when the ignition switch is again turned off, the second inlet valve 22B and the second outlet valve 24B are tested. The process is repeated so each time the ignition switch is turned off, one of the first inlet valve 22A and the first outlet valve 24A, the second inlet valve 22B and the second outlet valve 24B, the third inlet valve 22C and the third outlet valve 24C and the fourth inlet valve 22D and the fourth outlet valve 24D are tested in sequence. This reduces the testing time as compared to testing all of the first inlet valve 22A and the first outlet valve 24A, the second inlet valve 22B and the second outlet valve 24B, the third inlet valve 22C and the third outlet valve 24C and the fourth inlet valve 22D and the fourth outlet valve 24D each time the ignition switch is turned off.

Figure 2:
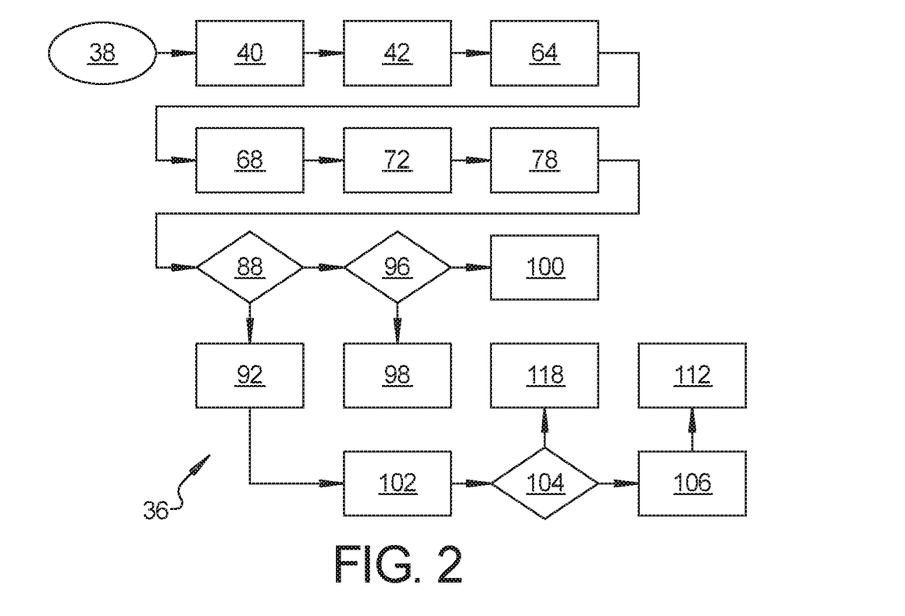
FIG. 2 is a flow chart illustrating a method according to an exemplary embodiment of the present disclosure.

Referring to FIG. 2, a flow chart 36 illustrates the method of testing one of the inlet valves 22A, 22B, 22C, 22D. Starting at block 38, the ignition switch is turned off and the test sequence begins. It should be understood that other suitable events may trigger the testing.

At block 40, all of the inlet valves 22A, 22B, 22C, 22D are closed, all of the outlet valves 24A, 24B, 24C, 24D are closed and the primary and secondary boost isolation valves 26, 32 are moved to the second position.

Moving to block 42, the brake booster 18 is actuated. The brake booster 18 includes a plunger 44 that when actuated moves forward, as indicated by arrow 46, to push brake fluid from the brake booster 18 through the brake booster circuit 30 to the primary and secondary boost isolation valves 26, 32. The primary and secondary boost isolation valves 26, 32, now in the second position, allow brake fluid to flow to the inlet valves 22A, 22B, 22C, 22D. Because the inlet valves 22A, 22B, 22C, 22D are closed, pressure of the brake fluid between the inlet valves 22A, 22B, 22C, 22D and the brake booster 18 will increase as the plunger 44 within the brake booster 18 moves forward. The brake booster 18 is actuated until the pressure of the brake fluid between the brake booster 18 and the inlet valves 22A, 22B, 22C, 22D increases to a pre-determined Boost Pressure. The pressure of the brake fluid between the brake booster 18 and the inlet valves 22A, 22B, 22C, 22D is measured by a brake booster circuit pressure sensor 66 that is located within the brake booster circuit 30.

Figure 4:
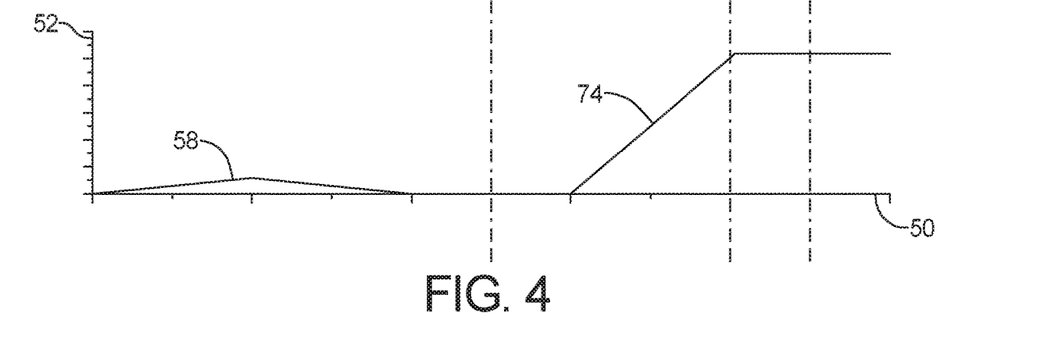
FIG. 4 is a chart plotting the position of a plunger of a brake booster versus time.
Figure 5:
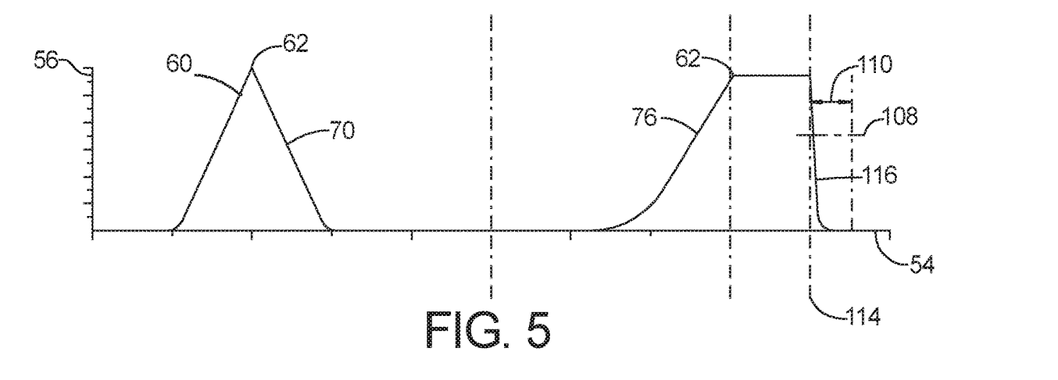
FIG. 5 is a chart plotting pressure of a brake booster circuit versus time.

Referring to FIG. 4 and FIG. 5, FIG. 4 is a chart wherein the x-axis 50 denotes time, and the y-axis 52 denotes the position of the plunger 44 within the brake booster 18. FIG. 5 is a chart wherein the x-axis 54 denotes time and the y-axis 56 denotes the pressure of the brake fluid between the brake booster 18 and the inlet valves 22A, 22B, 22C, 22D (within the brake booster circuit 30), as measured by the brake booster pressure sensor 66. As the plunger 44 within the brake booster 18 moves forward, as indicated by 58 in FIG. 4, the pressure of the brake fluid between the brake booster 18 and the inlet valves 22A, 22B, 22C, 22D increases, as indicated at 60 in FIG. 5. Once the pressure of the brake fluid between the brake booster and the inlet valves reaches the pre-determined Boost Pressure 62, the brake booster 18 is deactivated and the plunger 44 within the brake booster 18 is retracted, causing the pressure within the brake booster circuit 30 to drop, as indicated at 70.

Moving on to block 64, a first plunger volume is calculated using the position of the plunger 44 within the brake booster 18. A position sensor 48 within the brake booster 18 determines the position of the plunger 44 within the brake booster 18.

Moving on to block 68, one of the first, second, third and fourth inlet valves 22A, 22B, 22C, 22D is opened, connecting the brake booster circuit 30 to one of the first, second, third and fourth brake assemblies 12A, 12B, 12C. 12D at one of the first, second, third and fourth wheels 14A. 14B, 14C, 14D.

Moving to block 72, the brake booster 18 is again actuated, moving the plunger 44 within the brake booster 18 forward. All of the outlet valves 24A, 24B, 24C, 24D are closed, as the plunger 44 moves forward, brake fluid will be pressurized between the brake booster 18 and the three of the inlet valves 22A, 22B, 22C, 22D that are still closed and the closed one of the outlet valves 24A, 24B, 24C, 24D that is associated with the opened one of the inlet valves 22A, 22B, 22C, 22D. For example, if the first inlet valve 22A is being tested, as the plunger 44 within the brake booster 18 moves forward, brake fluid will be pushed through the opened first inlet valve 22A and into the first brake assembly 12A. As the plunger 44 within the brake booster 18 continues to move forward, as indicated by 74 in FIG. 4, the pressure of the brake fluid between the brake booster 18 and the closed second, third and fourth inlet valves 22B, 22C, 22D and the closed first outlet valve 24A will increase, as indicated by 76 in FIG. 5. Once the pressure of the brake fluid between the brake booster 18 and the closed second, third and fourth inlet valves 22B, 22C, 22D and the closed first outlet valve 24A increases back to the pre-determined Boost Pressure 62, the brake booster 18 is de-activated and the plunger 44 within the brake booster 18 is held in place.

Moving on to block 78, a second plunger volume is calculated using the position of the plunger 44 within the brake booster 18. If the opened one of the inlet valves 22A, 22B, 22C, 22D failed to open, then there will not be a dramatic reduction in the pressure of the brake fluid in the brake booster circuit 30. Thus, when the brake booster 18 is re-activated at block 72, the plunger 44 within the brake booster 18 will only need to move slightly or not at all to bring the pressure within the brake booster circuit 30 back up to the pre-determined Boost Pressure 62, and the difference between the first and second plunger volume will be minimal or even zero. Thus, when the brake booster 18 is re-activated at block 72, the plunger 44 within the brake booster 18 will need to move significantly to bring the pressure within the brake booster circuit 30 back up to the pre-determined Boost Pressure 62, and the difference between the first and second plunger volume will be significant.

Figure 6:
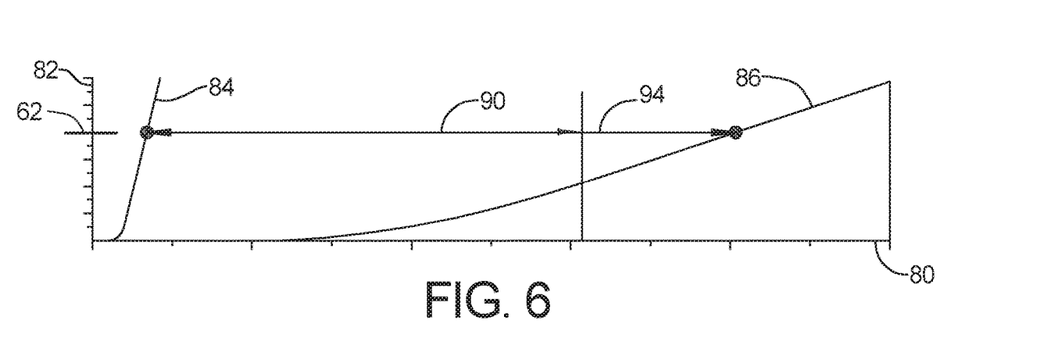
FIG. 6 is a chart plotting pressure of the brake booster circuit versus brake plunger volume.

Referring to FIG. 6, a chart is shown wherein the x-axis 80 denotes calculated plunger volume and the y-axis 82 denotes the pressure of the brake fluid within the brake booster circuit 30. The pressure increase that occurs when the brake booster 18 is activated with all inlet valves 22A, 22B, 22C, 22D closed is indicated at 84. The pressure increase that occurs when the brake booster 18 is re-activated after one of the first, second, third and fourth inlet valves 22A, 22B, 22C, 22D is closed is indicated at 86.

Moving to block 88, the difference between the first and second plunger volume is compared to an Expected Difference Threshold 90 at a pre-determined boost pressure level. Moving on to block 92, if the difference between the first and second plunger volume exceeds the Expected Difference Threshold 90, diagnostic information is sent indicating that the opened one of the first, second, third and fourth inlet valves 22A, 22B, 22C, 22D has not failed to the controller within the automotive vehicle. As shown in FIG. 6, the actual plunger volume difference 94 required to bring the pressure of the brake fluid within the brake booster circuit 30 exceeds the Expected Difference 90, and thus is an indication that the opened one of the first, second, third and fourth inlet valves 22A, 22B, 22C, 22D is functioning properly. The Expected Difference Threshold 90 is a measure that is calculated to account for the additional volume needed to be filled and pressurized by brake fluid when one of the inlet valves 22A, 22B, 22C, 22D has been opened.

Moving to block 96, if the difference between the first and second plunger volume does not exceed the Expected Difference Threshold 90, the first plunger volume is compared to an Fail Open Threshold. Moving to block 98, if the first plunger volume exceeds a Fail Open Threshold, diagnostic information is sent that the first one of the plurality of inlet valves 22A, 22B, 22C, 22D has failed to an open state to the controller within the automotive vehicle. When the brake booster 18 initially actuates, and all of the inlet valves 22A, 22B, 22C, 22D are actuated to a closed position, if the inlet valve that is being tested has failed to an open state, it will take longer for the brake booster 18 to build pressure within the brake booster circuit 30. The Fail Open Threshold is a plunger volume that is calculated to be beyond what would be expected when the inlet valves 22A, 22B, 22C, 22D are all closed.

Moving to block 100, if the difference between the first and second plunger volume does not exceed the Expected Difference Threshold, and if the first plunger volume does not exceed the Fail Open Threshold, diagnostic information is sent indicating that the one of the plurality of inlet valves 22A, 22B, 22C, 22D that is being tested has failed to a closed state to the controller within the automotive vehicle.

Moving to block 102, if the difference between the first and second plunger volume exceeds the Expected Difference Threshold 90, and it is determined that the tested one of the inlet valves 22A, 22B, 22C, 22D has not failed, the boost plunger 44 position is held constant, as shown in FIG. 4, and the one of the outlet valves 24A, 24B, 24C, 24D corresponding to the tested one of the inlet valves 22A, 22B, 22C, 22D is tested by opening the one of the outlet valves 24A, 24B, 24C, 24D corresponding to the tested one of the inlet valves 22A, 22B, 22C, 22D.

Moving to block 104, after the one of the outlet valves 24A, 24B, 24C, 24D corresponding to the tested one of the inlet valves 22A, 22B, 22C, 22D is opened, the pressure drop within the brake booster circuit 30 is monitored to determine how quickly the pressure within the brake booster circuit drops.

Moving to block 106, if the pressure of the brake fluid in the brake booster circuit 30 drops below a pre-determined threshold 108 within a pre-determined amount of time 110, diagnostic information is sent that the tested outlet valve has not failed to the controller within the automotive vehicle.

Referring to FIG. 5, when the tested outlet valve is opened at the time indicated by 114, if the tested one of the outlet valves 24A, 24B, 24C, 24D is functioning properly and opens, the pressurized brake fluid will flow through the tested one of the outlet valves 24A, 24B, 24C, 24D causing the pressure to drop in the brake booster circuit 30, as indicated at 116. If this is the case, the pressure will fall off below the pre-determined threshold 108 within the pre-determined amount of time, as indicated in FIG. 5.

If the pressure of the brake fluid between the brake booster 18 and the inlet valves 22A, 22B, 22C, 22D does not drop below the pre-determined threshold 108 within the pre-determined amount of time 110, moving to block 118, diagnostic information that the tested one of the outlet valves 24A, 24B, 24C, 24D has failed to a closed position is sent to the controller within the automotive vehicle.

Moving to block 112, the system resets itself and prepares to cycle at the next occurrence of a specified operating event of the vehicle, such as by way of non-limiting example, whenever the ignition of the automotive vehicle is shut off.

Figure 3:
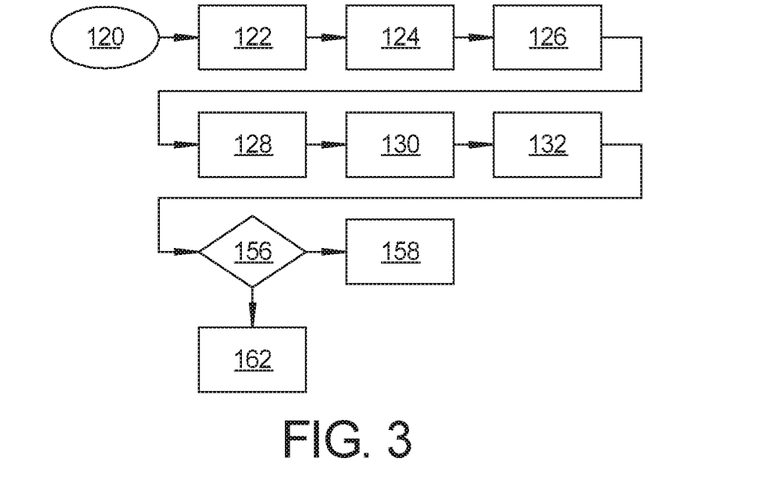
FIG. 3 is a flow chart illustrating further aspects of a method according to an exemplary embodiment of the present disclosure.

Referring to FIG. 3, in an exemplary embodiment of the present disclosure the method includes testing the secondary boost isolation valve 32, at block 120. Moving to block 122, the primary boost isolation valve 26 is actuated to the first position, the secondary boost isolation valve 32 is actuated to the second position and all of the inlet valves 22A, 22B, 22C, 22D are actuated to the closed position.

Moving to block 124, the brake booster 18 is actuated and the plunger 44 within the brake actuator 18 moves forward pressurizing the brake fluid between the brake booster 18 and the primary and secondary boost isolation valves 26, 32 (the brake booster circuit 30) to a pre-determined level. By way of non-limiting example, the brake fluid within the brake booster circuit 30 is pressurized to approximately 30 Bar. The brake fluid in the primary master cylinder circuit 28 is not pressurized, and the pressure difference between the brake booster circuit 30 and the primary master cylinder circuit 28 causes the primary boost isolation valve 26 to spontaneously move to the third position. At this point, the pressure of the brake fluid within the brake booster circuit 30 and the primary and secondary master cylinder circuits 28, 34 equalizes, wherein pressure between the brake booster 18 and the primary and secondary boost isolation valves 26, 32 is substantially equal to the pressure of the brake fluid between the master cylinder 16 and the primary and secondary boost isolation valves 26, 32.

Moving to block 126, the brake booster 18 is de-activated and the plunger 44 within the brake booster 18 moves back to de-pressurize the brake fluid in the brake booster circuit 30. Now the pressure in the primary and secondary master cylinder circuits 28, 34 is higher than the pressure in the brake booster circuit 30, causing the primary boost isolation valve 26 to spontaneously move back to the first position, the brake booster circuit 30 is de-pressurized, and the primary and secondary master cylinder circuits 28, 34 remain pressurized.

Moving to block 128, the third and fourth inlet valves 22C, 22D are actuated to an open position. Moving to block 130, the third and fourth outlet valves 24C, 24D are actuated to an open position. Moving to block 132, the secondary boost isolation valve 32 is actuated to the first position. Opening the third and fourth inlet valves 22C, 22D and the third and fourth outlet valves 24C, 24D provides a clear path for brake fluid to flow from the secondary boost isolation valve 32 through the third and fourth inlet valves 22C, 22D, through the third and fourth outlet valves 24C, 24D, and back to the brake fluid reservoir 20. When the secondary boost isolation valve 32 is actuated to the first position, brake fluid from the secondary master cylinder circuit 34 flows through the secondary boost isolation valve 32 causing the pressure of the brake fluid within the secondary master cylinder circuit 34 to fall off.

Figure 7:
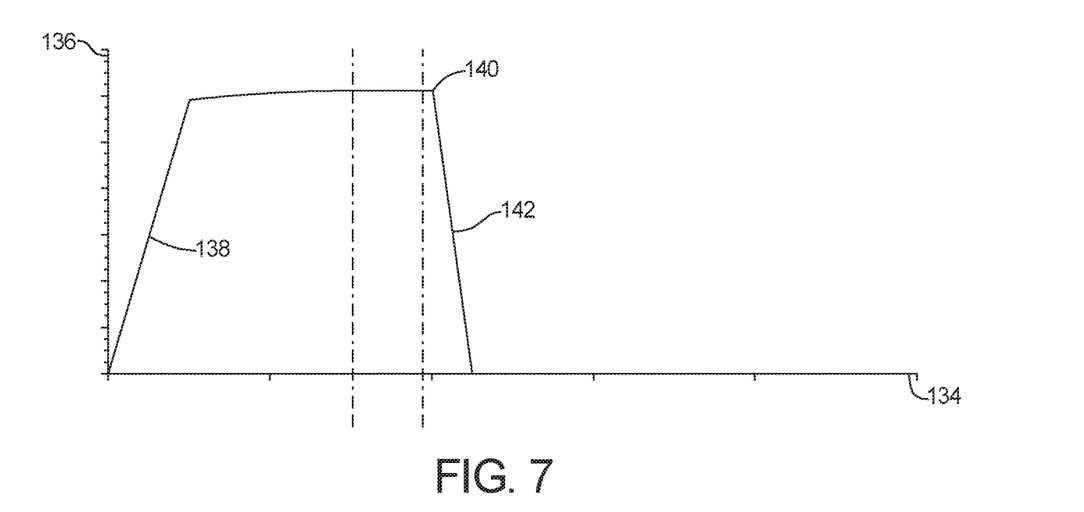
FIG. 7 is a chart plotting pressure of the bake booster circuit versus time.

Referring to FIG. 7, a chart is illustrated wherein the x-axis 134 denotes time and the y-axis 136 denotes pressure of the brake fluid within the brake booster circuit 30. Referring again to block 124, the brake booster is actuated and the plunger within the brake actuator moves forward pressurizing the brake fluid between the brake booster and the primary and secondary boost isolation valves 26, 32 (the brake booster circuit 30) to a pre-determined level, as indicated at 138 in FIG. 7. Referring again to block 126, the brake booster is de-activated, as indicated at 140 in FIG. 7, and the plunger 44 within the brake booster 18 moves back to de-pressurize the brake fluid in the brake booster circuit 30, as indicated by 142 in FIG. 7.

Figure 8:
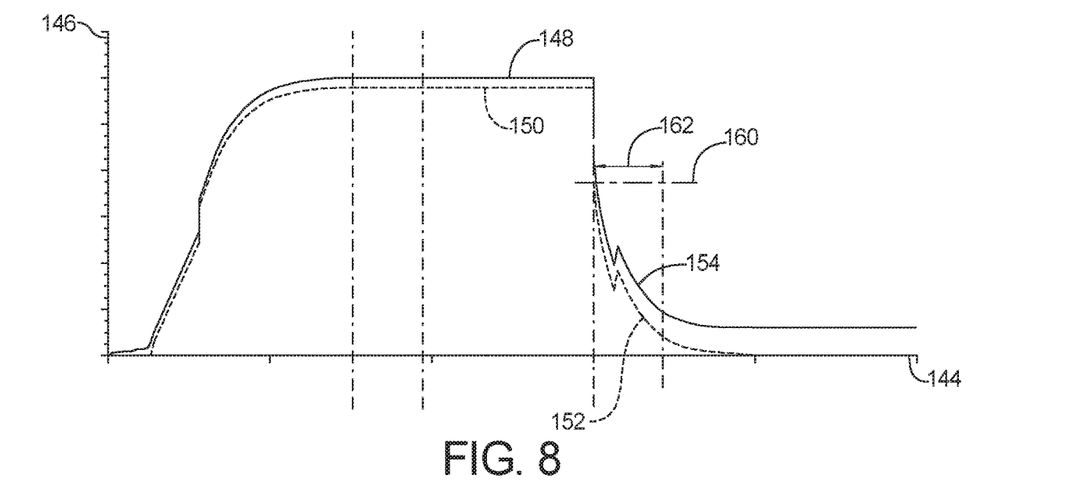
FIG. 8 is a chart plotting pressure of a master cylinder circuit versus time.

Referring to FIG. 8, a chart illustrates wherein the x-axis 144 denotes time and the y-axis 146 denotes the pressure of brake fluid in the primary and secondary master cylinder circuits 28, 34. Referring again to block 126, the brake booster 18 is de-activated and the plunger 44 within the brake booster 18 moves back to de-pressurize the brake fluid in the brake booster circuit, as indicated at 142 in FIG. 7, and the primary and secondary master cylinder circuits 28, 34 remain pressurized, as indicated by 148 and 150 in FIG. 8.

Referring again to block 128, the third and fourth inlet valves are actuated to an open position. Referring again to block 130, the third and fourth outlet valves are actuated to an open position. Referring again to block 132, the secondary boost isolation valve is actuated to the first position. When the secondary boost isolation valve 32 is actuated to the first position, brake fluid from the secondary master cylinder circuit 34 flows through the secondary boost isolation valve 32 causing the pressure of the brake fluid within the secondary master cylinder circuit 34 to fall off, as indicated by 152 in FIG. 8.

If the secondary boost isolation valve 32 is functioning properly, the pressure of the brake fluid within the secondary master cylinder circuit 34 will fall off, as indicated by the line 152. Correspondingly, the pressure within the primary master cylinder circuit 28 will fall off slightly slower than the secondary master cylinder circuit 34, as indicated by the line 154 in FIG. 8.

Moving to block 156, the pressure of the brake fluid between the master cylinder 16 and the secondary boost isolation valve 32 is monitored to determine how quickly the pressure falls off. Moving to block 158, if the pressure of the brake fluid between the master cylinder 16 and the secondary boost isolation valve 32 does not fall below a pre-determined threshold 160 within a pre-determined amount of time 162, diagnostic information is sent that the secondary boost isolation valve has failed.

If the pressure of the brake fluid between the master cylinder 16 and the secondary boost isolation valve 32 (secondary master cylinder circuit 34) falls below the pre-determined threshold 160 within the pre-determined amount of time 162, as shown in FIG. 8, moving to block 162, diagnostic information is sent that the secondary boost isolation valve 32 is functioning properly.

Similarly to the first inlet valve 22A and the first outlet valve 24A, the second inlet valve 22B and the second outlet valve 24B, the third inlet valve 22C and the third outlet valve 24C and the fourth inlet valve 22D and the fourth outlet valve 24D, the secondary boost isolation valve 32 may be tested upon the occurrence of an operational event of the automotive vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of testing a braking system for an automotive vehicle that includes a master cylinder, a brake booster, a plurality of brake assemblies, a plurality of inlet valves, each inlet valve adapted to selectively allow brake fluid to flow into one of the plurality of brake assemblies and a plurality of outlet valves, each outlet valve adapted to selectively allow brake fluid to flow from one of the brake assemblies to a brake fluid reservoir, the method comprising:
   testing a first one of the plurality of inlet valves, including:
      closing all of the inlet valves;
      actuating the brake booster and increasing the pressure of the brake fluid between the brake booster and the inlet valves to a pre-determined Boost Pressure;
      measuring a first plunger volume of the brake booster;
      opening the first one of the plurality of inlet valves;
      actuating the brake booster and increasing the pressure of the brake fluid between the brake booster and the inlet valves to the pre-determined Boost Pressure; and
      measuring a second plunger volume of the brake booster;
   testing a first one of the plurality of outlet valves; and
   sending diagnostic information to a controller within the automotive vehicle.

2. The method of claim 1, further including:
   when the difference between the first and second plunger volume exceeds an Expected Difference Threshold, sending diagnostic information that the first one of the plurality of inlet valves has not failed to the controller within the automotive vehicle.

3. The method of claim 2, further including:
   when the difference between the first and second plunger volume does not exceed the Expected Difference Threshold, and when the first plunger volume exceeds a Fail Open Threshold, sending diagnostic information that the first one of the plurality of inlet valves has failed to an open state to the controller within the automotive vehicle.

4. The method of claim 3, further including:
   when the difference between the first and second plunger volume does not exceed the Expected Difference Threshold, and when the first plunger volume does not exceed the Fail Open Threshold, sending diagnostic information that the first one of the plurality of inlet valves has failed to a closed state to the controller within the automotive vehicle.

5. The method of claim 2, wherein testing a first one of the plurality of inlet valves further includes:
   opening the first one of the plurality of outlet valves; and when the pressure of the brake fluid between the brake booster and the inlet valves drops below a pre-determined threshold within a pre-determined amount of time, sending diagnostic information that the first one of the plurality of outlet valves has not failed to the controller within the automotive vehicle.

6. The method of claim 5, further including, when the pressure of the brake fluid between the brake booster and the inlet valves does not drop below a pre-determined threshold within a pre-determined amount of time, sending diagnostic information that the first one of the plurality of outlet valves has failed to a closed position to the controller within the automotive vehicle.

7. The method of claim 1, further including testing the first one of the plurality of inlet valves and testing the first one of the plurality of outlet valves upon the occurrence of an operating event of the automotive vehicle, testing a second one of the plurality of inlet valves and testing a second one of the plurality of outlet valves upon the next occurrence of the operating event of the automotive vehicle.

8. The method of claim 1, further including testing the first one of the plurality of inlet valves and testing the first one of the plurality of outlet valves upon the occurrence of an operating event of the automotive vehicle, and sequentially testing a different one of the plurality of inlet valves and testing a different one of the plurality of outlet valves upon each occurrence of the operating event of the automotive vehicle.

9. The method of claim 1, wherein:
a primary boost isolation valve is positioned between the brake booster and two of the plurality of inlet valves and between the master cylinder and the two of the plurality of inlet valves, the primary boost isolation valve is selectively moveable between a first position, wherein flow of brake fluid only from the master cylinder to the two of the plurality of inlet valves is open, a second position, wherein flow of brake fluid from only the brake booster to the two of the plurality of inlet valves is open, and a third position, wherein flow of brake fluid from both the master cylinder and the brake booster to the two of the plurality of inlet valves is open;
a secondary boost isolation valve is positioned between the brake booster and at the remaining of the plurality of inlet valves and between the master cylinder and the remaining of the plurality of inlet valves, the secondary boost isolation valve is selectively moveable between a first position, wherein flow of brake fluid only from the master cylinder to the remaining of the plurality of inlet valves is open, a second position, wherein flow of brake fluid from only the brake booster to the remaining of the plurality of inlet valves is open, and a third position, wherein flow of brake fluid from both the master cylinder and the brake booster to the remaining of the plurality of inlet valves is open, the method including:
actuating the primary boost isolation valve to the first position;
actuating the secondary boost isolation valve to the second position;
actuating all of the plurality of inlet valves to the closed position;
actuating the brake booster to increase the pressure of the brake fluid between the brake booster and the primary and secondary boost isolation valves to a pre-determined level, thereby causing the primary boost isolation valve to spontaneously move to the third position, wherein pressure between the brake booster and the primary and secondary boost isolation valves is substantially equal to the pressure of the brake fluid between the master cylinder and the primary and secondary boost isolation valves;
de-activating the brake booster, thereby causing the primary boost isolation valve to spontaneously move back to the first position;
actuating the remaining of the plurality of inlet valves to the open position;
actuating the remaining of the plurality of outlet valves to the open position;
actuating the secondary boost isolation valve to the first position; and
when the pressure of the brake fluid between the master cylinder and the secondary boost isolation valve falls below a pre-determined threshold within a pre-determined amount of time, sending diagnostic information that the secondary boost isolation valve is functioning properly.

10. The method of claim 9, further including, when the pressure of the brake fluid between the master cylinder and the secondary boost isolation valve does not fall below a pre-determined threshold within a pre-determined amount of time, sending diagnostic information that the secondary boost isolation valve has failed.

11. A method of testing a braking system for an automotive vehicle that includes a brake booster, a first brake assembly associated with a first wheel of the automotive vehicle, a second brake assembly associated with a second wheel of the automotive vehicle, a third brake assembly associated with a third wheel of the motor vehicle, and a fourth brake assembly associated with a fourth wheel of the automotive vehicle, a first inlet valve adapted to selectively allow flow of brake fluid to the first brake assembly, a second inlet valve adapted to selectively allow flow of brake fluid to the second brake assembly, a third inlet valve adapted to selectively allow flow of brake fluid to the third brake assembly, and a fourth inlet valve adapted to selectively allow flow of brake fluid to the fourth brake assembly, a first outlet valve adapted to selectively allow brake fluid to flow from the first brake assembly to a brake fluid reservoir, a second outlet valve adapted to selectively allow flow of brake fluid from the second brake assembly to the brake fluid reservoir, a third outlet valve adapted to selectively allow flow of brake fluid from the third brake assembly to the brake fluid reservoir, and a fourth outlet valve adapted to selectively allow brake fluid to flow from the fourth brake assembly to the brake fluid reservoir, the method comprising:
sequentially and alternately testing one of the first inlet valve and the first outlet valve, the second inlet valve and the second outlet valve, the third inlet valve and the third outlet valve and the fourth inlet valve and the fourth outlet valve upon consecutive occurrences of an operational event of the automotive vehicle; and
sending diagnostic information to a controller within the automotive vehicle each time one of the first inlet valve and the first outlet valve, the second inlet valve and the second outlet valve, the third inlet valve and the third outlet valve and the fourth inlet valve and the fourth outlet valve is tested.

12. The method of claim 11, wherein sequentially and alternately testing one of the first inlet valve and the first outlet valve, the second inlet valve and the second outlet valve, the third inlet valve and the third outlet valve and the fourth inlet valve and the fourth outlet valve upon the occurrence of an operational event of the automotive vehicle further includes:
  closing the first, second, third and fourth inlet valves;
  actuating the brake booster and increasing the pressure of the brake fluid between the brake booster and the inlet valves to a pre-determined Boost Pressure;
  measuring a first plunger volume of the brake booster;
  actuating one of the first, second, third and fourth inlet valves to an open position;
  actuating the brake booster and increasing the pressure of the brake fluid between the brake booster and the first, second, third and fourth inlet valves to the pre-determined Boost Pressure;
  measuring a second plunger volume of the brake booster; and
  when the difference between the first and second plunger volume exceeds an Expected Difference Threshold, sending diagnostic information that the actuated one of the first, second, third and fourth inlet valves has not failed to the controller within the automotive vehicle.

13. The method of claim 12, further including:
  when the difference between the first and second plunger volume does not exceed the Expected Difference Threshold, and when the first plunger volume exceeds a Fail Open Threshold, sending diagnostic information that the actuated one of the first, second, third and fourth inlet valves has failed to an open state to the controller within the automotive vehicle.

14. The method of claim 13, further including:
  when the difference between the first and second plunger volume does not exceed the Expected Difference Threshold, and when the first plunger volume does not exceed the Fail Open Threshold, sending diagnostic information that the actuated one of the first, second, third and fourth inlet valves has failed to a closed state to the controller within the automotive vehicle.

15. The method of claim 12, wherein sequentially and alternately testing one of the first inlet valve and the first outlet valve, the second inlet valve and the second outlet valve, the third inlet valve and the third outlet valve and the fourth inlet valve and the fourth outlet valve upon the occurrence of an operational event of the automotive vehicle further includes:
  actuating one of the first, second, third and fourth outlet valves corresponding to the actuated one of the first, second, third and fourth inlet valves to an open position; and
  when the pressure of the brake fluid between the brake booster and the first, second, third and fourth inlet valves drops below a pre-determined threshold within a pre-determined amount of time, sending diagnostic information that the actuated one of the first, second, third and fourth outlet valves has not failed to the controller within the automotive vehicle.

16. The method of claim 15, further including, when the pressure of the brake fluid between the brake booster and the first, second, third and fourth inlet valves does not drop below a pre-determined threshold within a pre-determined amount of time, sending diagnostic information that the actuated one of the first, second, third and fourth outlet valves has failed to a closed position to the controller within the automotive vehicle.

17. The method of claim 16, wherein:
  a primary boost isolation valve is positioned between the brake booster and the first and second inlet valves and between the master cylinder and the first and second inlet valves, the primary boost isolation valve is selectively moveable between a first position, wherein flow of brake fluid only from the master cylinder to the first and second inlet valves is open, a second position, wherein flow of brake fluid from only the brake booster to the first and second inlet valves is open, and a third position, wherein flow of brake fluid from both the master cylinder and the brake booster to the first and second inlet valves is open;
  a secondary boost isolation valve is positioned between the brake booster and at the third and fourth inlet valves and between the master cylinder and the third and fourth inlet valves, the secondary boost isolation valve is selectively moveable between a first position, wherein flow of brake fluid only from the master cylinder to the third and fourth inlet valves is open, a second position, wherein flow of brake fluid from only the brake booster to the third and fourth inlet valves is open, and a third position, wherein flow of brake fluid from both the master cylinder and the brake booster to the third and fourth inlet valves is open, the method including:
  actuating the primary boost isolation valve to the first position;
  actuating the secondary boost isolation valve to the second position;
  actuating the first, second third and fourth inlet valves to the closed position;
  actuating the brake booster to increase the pressure of the brake fluid between the brake booster and the primary and secondary boost isolation valves to a pre-determined level, thereby causing the primary boost isolation valve to spontaneously move to the third position, wherein pressure between the brake booster and the primary and secondary boost isolation valves is substantially equal to the pressure of the brake fluid between the master cylinder and the primary and secondary boost isolation valves;
  de-activating the brake booster, thereby causing the primary boost isolation valve to spontaneously move back to the first position;
  actuating the third and fourth inlet valves to the open position;
  actuating the third and fourth outlet valves to the open position;
  actuating the secondary boost isolation valve to the first position; and
  when the pressure of the brake fluid between the master cylinder and the secondary boost isolation valve falls below a pre-determined threshold within a pre-determined amount of time, sending diagnostic information that the secondary boost isolation valve is functioning properly; and
  when the pressure of the brake fluid between the master cylinder and the secondary boost isolation valve does not fall below a pre-determined threshold within a pre-determined amount of time, sending diagnostic information that the secondary boost isolation valve has failed.

18. A method of testing a braking system for an automotive vehicle comprising:
  upon consecutive occurrences of an operational event of the automotive vehicle sequentially and alternately testing one of a first inlet valve and a first outlet valve that are associated with a first wheel and first brake assembly, a second inlet valve and a second outlet valve that are associated with a second wheel and a second brake assembly, a third inlet valve and a third outlet valve that are associated with a third wheel and a third brake assembly, and a fourth inlet valve and a fourth outlet valve that are associated with a fourth wheel and a fourth brake, wherein testing one of the first inlet valve and the first outlet valve, the second inlet valve and the second outlet valve, the third inlet valve and the third outlet valve and the fourth inlet valve and the fourth outlet valve further includes:

closing the first, second, third and fourth inlet valves;

actuating a brake booster and increasing the pressure of brake fluid between the brake booster and the first, second, third and fourth inlet valves to a pre-determined Boost Pressure;

measuring a first plunger volume of the brake booster;

actuating one of the first, second, third and fourth inlet valves to an open position;

actuating the brake booster and increasing the pressure of brake fluid between the brake booster and the first, second, third and fourth inlet valves to the pre-determined Boost Pressure;

measuring a second plunger volume of the brake booster; and when the difference between the first and second plunger volume exceeds an Expected Difference Threshold, sending diagnostic information that the actuated one of the first, second, third and fourth inlet valves has not failed to the controller within the automotive vehicle; and when the difference between the first and second plunger volume does not exceed the Expected Difference Threshold, and when the first plunger volume exceeds a Fail Open Threshold, sending diagnostic information that the actuated one of the first, second, third and fourth inlet valves has failed to an open state to the controller within the automotive vehicle; and when the difference between the first and second plunger volume does not exceed the Expected Difference Threshold, and when the first plunger volume does not exceed the Fail Open Threshold, sending diagnostic information that the actuated one of the first, second, third and fourth inlet valves has failed to a closed state to the controller within the automotive vehicle.

19. The method of claim 18, wherein testing one of the first inlet valve and the first outlet valve, the second inlet valve and the second outlet valve, the third inlet valve and the third outlet valve and the fourth inlet valve and the fourth outlet valve further includes:

actuating one of the first, second, third and fourth outlet valves corresponding to the actuated one of the first, second, third and fourth inlet valves to an open position; and when the pressure of the brake fluid between the brake booster and the first, second, third and fourth inlet valves drops below a pre-determined threshold within a pre-determined amount of time, sending diagnostic information that the actuated one of the first, second, third and fourth outlet valves has not failed to the controller within the automotive vehicle; and when the pressure of the brake fluid between the brake booster and the first, second, third and fourth inlet valves does not drop below a pre-determined threshold within a pre-determined amount of time, sending diagnostic information that the actuated one of the first, second, third and fourth outlet valves has failed to a closed position to the controller within the automotive vehicle.

20. The method of claim 19, further including:

actuating a primary boost isolation valve to a first position, wherein the primary boost isolation valve is positioned between the brake booster and the first and second inlet valves and between a master cylinder and the first and second inlet valves and is selectively moveable between a first position, wherein flow of brake fluid only from the master cylinder to the first and second inlet valves is open, a second position, wherein flow of brake fluid from only the brake booster to the first and second inlet valves is open, and a third position, wherein flow of brake fluid from both the master cylinder and the brake booster to the first and second inlet valves is open;

actuating a secondary boost isolation valve to a second position, wherein the secondary boost isolation valve is positioned between the brake booster and at the third and fourth inlet valves and between the master cylinder and the third and fourth inlet valves, the secondary boost isolation valve is selectively moveable between a first position, wherein flow of brake fluid only from the master cylinder to the third and fourth inlet valves is open, a second position, wherein flow of brake fluid from only the brake booster to the third and fourth inlet valves is open, and a third position, wherein flow of brake fluid from both the master cylinder and the brake booster to the third and fourth inlet valves is open;

actuating the first, second third and fourth inlet valves to the closed position;

actuating the brake booster to increase the pressure of the brake fluid between the brake booster and the primary and secondary boost isolation valves to a pre-determined level, thereby causing the primary boost isolation valve to spontaneously move to the third position, wherein pressure between the brake booster and the primary and secondary boost isolation valves is substantially equal to the pressure of the brake fluid between the master cylinder and the primary and secondary boost isolation valves;

de-activating the brake booster, thereby causing the primary boost isolation valve to spontaneously move back to the first position;

actuating the third and fourth inlet valves to the open position;

actuating the third and fourth outlet valves to the open position;

actuating the secondary boost isolation valve to the first position; and when the pressure of the brake fluid between the master cylinder and the secondary boost isolation valve falls below a pre-determined threshold within a pre-determined amount of time, sending diagnostic information that the secondary boost isolation valve is functioning properly; and when the pressure of the brake fluid between the master cylinder and the secondary boost isolation valve does not fall below a pre-determined threshold within a pre-determined amount of time, sending diagnostic information that the secondary boost isolation valve has failed.

* * * * *